United States Patent Office 2,838,558
Patented June 10, 1958

2,838,558
CATALYTIC PRODUCTION OF AROMATIC NITRILES AND IMIDES

David James Hadley, Epsom Downs, and Barrie Wood, Hull, England, assignors to The Distillers Company Limited, Edinburgh, Scotland, a British company No Drawing. Application September 20, 1956
Serial No. 610,901

Claims priority, application Great Britain
September 27, 1955

13 Claims. (Cl. 260—465)

The present invention relates to the production of aromatic nitriles and/or imides by the reaction of alkyl-substituted aromatic compounds or their monohalo derivatives with ammonia and molecular oxygen.

The production of nitriles and/or imides by the catalysed reaction of alkyl-substituted aromatic hydrocarbons or their monohalo derivatives with ammonia and molecular oxygen at elevated temperatures in the vapour phase has already been proposed. Hitherto, the attainment of high yields with good efficiency has not been possible and the product gases have contained substantial quantities of carbon dioxide, the process as a result being economically unattractive for use on an industrial scale.

It is an object of the present invention to provide a process for the production of aromatic nitriles and/or imides in high yield and with good efficiency of conversion from alkyl-substituted aromatic hydrocarbons or their monohalo derivatives.

According to the present invention the process comprises contacting at an elevated temperature a mixture in the vapour phase of an alkyl-substituted aromatic hydrocarbon or its monohalo derivative, ammonia and molecular oxygen with a catalyst comprising vanadium oxide deposited on activated alumina, the latter having been heated prior to deposition to a temperature in the range of 1000° C. to 1500° C.

The alkyl-substituted aromatic hydrocarbons or their monohalo derivatives suitable for conversion into nitriles by the process of the present invention are benzene or naphthalene, or their monohalo derivatives substituted by at least one group represented by the formula

where $R_1$, $R_2$ and $R_3$ each represent a hydrogen atom, a lower alkyl group or a lower alkenyl group. Examples of specific alkyl-substituted aromatic hydrocarbons or their monohalo derivatives which may be used, are toluene and ethylbenzene, which are converted to benzonitrile; ortho-xylene which is converted to phthalimide, ortho-tolunitrile and phthalonitrile; meta-xylene, which is converted to iso-phthalonitrile and meta-tolunitrile; para-xylene, which is converted to terephthalonitrile and para-tolunitrile; mesitylene, which is converted to tri-cyanobenzene; ortho-, meta, and para-diisopropylbenzene; ortho-, meta-, and para-cymene; chlorotoluene; and α- and β-methyl naphthalene.

The catalyst used in the process of the present invention comprises vanadium oxide deposited on activated alumina which has previously been heated to a temperature in the range of 1000° C. to 1500° C., for a period of not less than about 3 hours. The catalyst may be prepared, for instance, by evaporating a solution of vanadyl oxalate on to 10–18 mesh (British Standard Testing Sieves) activated alumina, which has previously been heated at about 1350° C. for about 20–24 hours, and then allowed to cool. The mixture is evaporated to dryness at about 100° C. with frequent stirring and is then heated in a stream of air at a temperature of 350° C. to 400° C. The proportion of vanadium oxide in the catalyst may be varied quite considerably, for instance proportions between 0.1 and 10% may be used, and preferably about 5% based on the weight of the total catalyst. In order to facilitate heat dissipation in the highly exothermic reaction, it is advantageous to mix with the granules of active catalyst granules of an inert diluting material such as brick, pumice, carborundum and the like. This provides a convenient means for regulating the heat output per unit volume of reactor.

The reaction may be carried out over a moderately wide temperature range, for instance between 300° and 450° C., and preferably between 330° and 420° C. The contact time may likewise vary, but we have found that contact times of between 0.25 and 20 seconds are suitable. We have found that by using as catalyst vanadium oxide deposited on heat treated activated alumina, yields of over 70% of nitriles can be obtained without difficulty, but that the temperature of heat treatment of the catalyst support, contact time and the reaction temperature must be carefully chosen to obtain the higher yields. The selection of the exact combination of reaction conditions will be understood by one skilled in the art. Thus the higher the temperature of heat treatment of the catalyst support the less active will be the resulting catalyst, i. e. the most active catalysts are produced by heating the alumina at about 1000° C. and the least active catalysts are produced by heating at about 1500° C. Such catalysts have a surface area of between about 15 and ½ sq. metres per gram. Heat treatment temperatures above 1500° C. are not desirable for practical reasons. With the more active catalysts it is necessary to use the less severe reaction conditions of contact time and reaction temperature in the ranges set out above, and vice versa. Furthermore, with a catalyst of medium activity, for instance one in which the support has been heated at 1250° or 1300° C., the contact time and reaction temperature are similarly adjusted to give the highest yields, the longer contact times being used with the lower reaction temperatures in the ranges set out above, and vice versa. Preferably the catalyst heat treatment and reaction temperatures should be chosen to give a contact time of the order of 0.5 to 5 seconds, although longer contact times may be used, for instance up to 20 seconds. The use of contact times longer than 6 seconds, though technically feasible, may require unduly large reactor sizes. The contact time may be as short as 0.25 seconds.

For the process according to the invention the known method of vapour phase catalysis may be applied. The catalyst may be a stationary or moving bed, and in view of the high heat output and the necessity of keeping good control of the temperature, a fluidised bed method may be of special advantage.

The concentration of oxygen in the reaction mixture may vary within wide limits. Generally it is preferred to feed to the reactor a gas mixture containing at least 5% of oxygen, and at least 3 moles of oxygen per mole of hydrocarbon. Such a mixture may be, for instance, air or mixtures of air with oxygen.

The ratio of ammonia to the alkyl-substituted aromatic hydrocarbon in the reaction mixture may vary within wide limits. It is however preferred to use between about 1½ and 2 times the theoretical amount of ammonia for the stoichiometric reaction, i. e. about 1½ to 2 moles of ammonia per mole of hydrocarbon where a mono-nitrile or imide is being formed, and about 3 to 4 moles of ammonia per mole of hydrocarbon where the desired product is a dinitrile. Lower or higher proportions of ammonia may be used if desired, but the yields obtained are generally inferior where lower proportions are used, and are not significantly increased by the use of higher proportions.

The concentration of alkyl-substituted aromatic hydrocarbon or the monohalo derivative in the mixture of the reactants is preferably kept low and it is desirable to use concentrations not higher than about 2% by volume of the total gaseous reaction mixture; 1½% by volume is preferred. If higher concentrations than this are used explosive mixtures of hydrocarbon and oxygen may be built up.

The aromatic nitriles and/or imides produced in the process of the present invention may be recovered by conventional means, for instance by cooling the hot gases to temperatures at which the nitriles will be deposited as liquids or as solids as the case may be, and can be dried in the usual manner.

The following examples illustrate ways in which the process of the present invention may be carried out in practice. In the examples the parts by weight and parts by volume bear the same relationship to each other as do kilograms to litres.

EXAMPLES 1 TO 5

A catalyst was prepared as follows:

Activated alumina (8–16 mesh B. S. S.) was heated for approximately 22 hours at 1250° C. One part by weight of powdered vanadium pentoxide was suspended in five parts by volume of distilled water. The suspension was heated to 90° C. and three to four parts by weight of oxalic acid were gradually added until the vanadium pentoxide was completely reduced and dissolved to give a blue solution of vanadyl oxalate. This solution was poured over nine parts by weight of the heat-treated alumina and then evaporated to dryness at about 100° C. with frequent stirring. The product was heated in a stream of air at 380° C. for 16 hours to oxidize the vanadyl oxalate to vanadium oxide. This catalyst contained 10% by weight of vanadium oxide.

A series of processes were carried out using this catalyst and other catalysts prepared similarly but with different temperatures of heat activation. With each catalyst a number of different runs were made using different conditions of contact time and reaction temperature. The appropriate quantity of catalyst was placed in a U-shaped Pyrex glass tubular reactor, heated by a liquid bath and through it was passed the pre-heated mixture of para-xylene, ammonia and air. The para-xylene was present in a proportion of 1½% by volume of the total reaction mixture. The product gases leaving the reactor were passed into a large air-cooled receiver in which the terephthalonitrile was deposited as a white solid.

The results are shown in Table 1.

EXAMPLE 6

A catalyst was prepared as described in Examples 1 to 5, except that the final catalyst contained 5% by weight of vanadium oxide based on the weight of total catalyst. The alumina support was heat treated at 1400° C.

Three processes were carried out as described in Examples 1 to 5 using different reaction temperatures and a contact time of 6 seconds. The results are given in Table 2.

Table 2

| Run No. | Reaction Temperature, °C. | Percent yield terephthalonitrile | Percent yield p-tolunitrile | Percent yield carbon dioxide |
|---|---|---|---|---|
| 1 | 375 | 66 | 14 | 5 |
| 2 | 385 | 80 | 1 | 9 |
| 3 | 400 | 74 | 1 | 17 |

EXAMPLE 7

A catalyst was prepared as follows: Activated alumina (8–16 mesh B. S. S.) was heated for approximately 22 hours at 1350° C. One part by weight of powdered vanadium pentoxide was suspended in five parts by volume of distilled water. The suspension was heated to 90° C. and three to four parts by weight of oxalic acid were gradually added until the vanadium pentoxide was completely reduced and dissolved to give a blue solution of vanadyl oxalate. This solution was poured over nine parts by weight of the heat-treated alumina and then evaporated to dryness at about 100° C. with frequent stirring. The product was heated in a stream of air at 380° C. for 16 hours to oxidize the vanadyl oxalate to vanadium oxide. This catalyst contained 10% by weight of vanadium oxide.

The appropriate quantity of catalyst was placed in a U-shaped stainless steel tubular reactor, heated by a liquid bath to 369° C. and through it was passed the pre-heated mixture of meta-xylene, ammonia and air, at the rate of about 170 litres per hour per litre of catalyst (calculated at N. T. P.). The reaction mixture contained 1% by volume of m-xylene and 4% by volume of ammonia. The product gases leaving the reactor were passed into a large air-cooled receiver in which the isophthalonitrile was deposited as a white solid. A yield of over 70% of isophthalonitrile was obtained, together with traces of m-tolunitrile.

EXAMPLE 8

A catalyst was prepared as follows: Activated alumina (8–16 mesh B. S. S.) was heated for approximately 22 hours at 1400° C. One part by weight of powdered vanadium pentoxide was suspended in five parts by volume of distilled water. The suspension was heated to 90° C. and three to four parts by weight of oxalic acid were gradually added until the vanadium pentoxide was com- Table 1

| Ex. No. | Run No. | Catalyst heat treatment, °C. | Contact time, secs. | Reaction temperature, °C. | NH₃/xylene | Percent Yield terephthalonitrile | Percent Yield paratolunitrile | Percent Yield carbon dioxide |
|---|---|---|---|---|---|---|---|---|
| 1 | 1 | 1,050 | 6 | 360 | 4.0 | 66 | <1 | 18 |
|   | 2 | 1,050 | 6 | 380 | 4.0 | 53 | <1 | 28 |
| 2 | 1 | 1,250 | 6 | 370 | 6 | 77 | <1 | 12 |
|   | 2 | 1,250 | 2 | 395 | 6 | 70 | 1 | 8 |
|   | 3 | 1,250 | 6 | 395 | 4 | 47 | <1 | 38 |
| 3 | 1 | 1,300 | 6 | 355 | 5.0 | 61 | 15 | 5 |
|   | 2 | 1,300 | 6 | 375 | 5.0 | 74 | <1 | 14 |
|   | 3 | 1,300 | 1 | 395 | 6.0 | 77 | 1 | 8 |
|   | 4 | 1,300 | 6 | 395 | 2.8 | 30 | 1 | 53 |
| 4 | 1 | 1,325 | 6 | 370 | 4 | 70 | <1 | 19 |
|   | 2 | 1,325 | 2 | 395 | 4 | 76 | <1 | 12 |
|   | 3 | 1,325 | 6 | 395 | 7.0 | 52 | <1 | 33 |
|   | 4 | 1,325 | 7.5 | 395 | 5.7 | 38 | <1 | 44 |
| 5 | 1 | 1,400 | 6 | 355 | 2.7 | 37 | 29 | 6 |
|   | 2 | 1,400 | 6 | 395 | 5.3 | 73 | 0 | 20 | pletely reduced and dissolved to give a blue solution of vanadyl oxalate. This solution was poured over nine parts by weight of the heat treated alumina and then evaporated to dryness at about 100° C. with frequent stirring. The product was heated in a stream of air at 380° C. for 16 hours to oxidise the vanadyl oxalate to vanadium oxide. This catalyst contained 10% by weight of vanadium oxide.

The catalyst was placed in a glass tubular reactor of 6 mm. internal diameter, and immersed in a liquid bath at 395° C. Air, containing 1.6% by volume of o-xylene and 6.4% by volume of ammonia, was pre-heated to 395° C. and passed over the catalyst at this temperature and at a contact time of 6 seconds, calculated for the empty reactor space at normal temperature and pressure. The hot gasses were quenched in a glass receiver, in which phthalimide was deposited in the form of colourless flakes. A small quantity of phthalonitrile was also produced which was extracted from the phthalimide with cold benzine. The yield of phthalimide based on the quantity of xylene fed to the reactor was 72%, and the amount of xylene converted to carbon dioxide was 18%.

EXAMPLE 9

A catalyst was prepared as described in Example 8, except that the temperature of heat treatment of the activated alumina was 1325° C.

The catalyst was placed in a glass reactor heated by a liquid bath at 380° C., and through it was passed a mixture of 1% by volume of p-diisopropylbenzene and 5% by volume of ammonia in air. The contact time was 4 seconds. Terephthalonitrile was deposited from the cooled exit gas in the proportion of 0.26 moles for each mole of p-diisopropylbenzene fed.

EXAMPLE 10

A mixture of 1% by volume of mesitylene and 6% by volume of ammonia in air was passed over the catalyst used in Example 9, in a reactor heated by a liquid bath at 370° C., the contact time being 5 seconds. The exit gases were cooled, to deposit a mixture of nitriles. For each mole of mesitylene fed there was obtained:

0.21 mole of 1:3:5-tricyanobenzene
0.26 mole of 3:5-dicyanotoluene
0.10 mole of 3:5-dimethylbenzonitrile

EXAMPLE 11

A catalyst containing 5% of vanadium oxide supported on heat-treated activated alumina, prepared as described in Example 6, was placed in a glass reactor heated by a liquid bath at 385° C., and through it was passed a mixture of 1.5% by volume of ethylbenzene and 6% by volume of ammonia in air. The contact time was 3 seconds. The exit gas was passed through a cold trap in which liquid products collected. Distillation of the latter afforded 0.53 moles of benzonitrile for each mole of ethylbenzene fed.

EXAMPLE 12

The process of Example 11 was repeated replacing the ethylbenzene with toluene. The reactor was heated by a liquid bath at 405° C. 0.44 moles of benzonitrile were obtained for each mole of toluene fed.

The nitriles and imides produced by the process of the present invention are particularly valuable intermediates in the production of esters, diamines, dyestuffs, and other important chemical compounds. For instance, terephthalonitrile may be converted to the fibre-forming linear polyester, polyethylene terephthalate, well known under the trade names "Terylene" and "Dacron." Phthalonitrile is an intermediate in the production of phthalocyanine dyes.

We claim:

1. The process which comprises contacting at an elevated temperature in the vapour phase, a mixture of a lower alkyl-substituted aromatic hydrocarbon of the benzene and naphthalene series, ammonia and molecular oxygen with a catalyst comprising vanadium oxide deposited on activated alumina, the latter having been heated prior to deposition to a temperature in the range of 1,000–1,500° C.

2. The process as claimed in claim 1 wherein the alkyl-substituted aromatic hydrocarbon is selected from the group consisting of toluene, ethylbenzene, orthodiisopropylbenzene, meta - diisopropylbenzene, para - diisopropylbenzene, cymene, mesitylene, α-methylnaphthalene, β-methylnaphthalene, monohalo derivatives of these compounds, and mixtures thereof.

3. The process as claimed in claim 1 wherein the alkyl-substituted aromatic hydrocarbon is selected from the group consisting of ortho-, meta- and para-xylene, monohalo derivatives of these compounds and mixtures thereof.

4. The process as claimed in claim 1 wherein the heating has been carried out for about 20–24 hours.

5. The process as claimed in claim 1 wherein the proportion of vanadium oxide in the catalyst is between 0.1 and 10% by weight of the total catalyst.

6. The process as claimed in claim 5 wherein the proportion of vanadium oxide is about 5%.

7. The process as claimed in claim 1 wherein the catalyst is mixed with granules of inert diluting material.

8. The process as claimed in claim 1 wherein the reaction is carried out at a temperature betwen 300 and 450° C.

9. The process as claimed in claim 8 wherein the reaction is carried out at a temperature between 330° and 420° C.

10. The process as claimed in claim 1 wherein the contact time is between 0.25 and 6 seconds.

11. The process as claimed in claim 1 wherein the mixture contains at least 5% of oxygen and at least 3 moles of oxygen per mole of hydrocarbon.

12. The process as claimed in claim 1 wherein the ratio of ammonia to alkyl substituted aromatic hydrocarbon in the mixture is between 1½–2 times the theoretical ratio for the stoichiometric reaction.

13. The process as claimed in claim 1 wherein the concentration of alkyl-substituted aromatic hydrocarbon in the mixture of reactants is about 1½% by volume.

References Cited in the file of this patent

UNITED STATES PATENTS 2,450,639    Denton et al. _____ Oct. 5, 1948
2,499,055    Cosby et al. _____ Feb. 28, 1950

OTHER REFERENCES

Mahan et al.; Abstract of application Serial No. 120,606, published June 5, 1951, 647 O. G. 311.